(12) United States Patent
Uchiyama

(10) Patent No.: US 11,141,896 B2
(45) Date of Patent: Oct. 12, 2021

(54) INJECTION MOLDING SYSTEM, INJECTION MOLDING MACHINE, AND PERIPHERAL DEVICE

(71) Applicant: FANUC CORPORATION, Yamanashi (JP)

(72) Inventor: Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 278 days.

(21) Appl. No.: 15/708,215

(22) Filed: Sep. 19, 2017

(65) Prior Publication Data

US 2018/0085985 A1   Mar. 29, 2018

(30) Foreign Application Priority Data

Sep. 23, 2016   (JP) .............................. JP2016-185863

(51) Int. Cl.
  *B29C 45/76*   (2006.01)
  *B29C 45/42*   (2006.01)
(52) U.S. Cl.
  CPC ...... *B29C 45/7626* (2013.01); *B29C 45/4225* (2013.01); *B29C 2045/4275* (2013.01);
  (Continued)
(58) Field of Classification Search
  CPC ............ B29C 45/7626; B29C 45/4225; B29C 2945/76568; B29C 2945/76418;
  (Continued)

(56) References Cited

U.S. PATENT DOCUMENTS 5,792,483 A * 8/1998 Siegrist ............... B29C 45/5008
                                                                425/135
6,275,741 B1 * 8/2001 Choi ....................... B29C 45/76
                                                                700/10

(Continued)

FOREIGN PATENT DOCUMENTS

CN       102069577 A      5/2011
EP       1 085 389 A1     3/2001
(Continued)

*Primary Examiner* — Francisco W Tschen
*Assistant Examiner* — Guy F Mongelli
(74) *Attorney, Agent, or Firm* — Studebaker & Brackett PC

(57) ABSTRACT

An injection molding system capable of easily calculating relative position information between a movable part of an injection molding machine and a movable part of a peripheral device is provided. A first control unit 110 of an injection molding machine 2 calculates first relative position information which is relative position information of a first movement position M1 set to a movable part 50 in relation to a first reference position K1 set to a first connection portion 80. A second control unit 210 of a robot 3 calculates second relative position information which is relative position information of a second movement position M2 set to a hand 65 in relation to a second reference position K2 set to a second connection portion 85. The first control unit 110 and the second control unit 210 calculate inter-drive-unit relative position information which is relative position information between the first movement position M1 and the second movement position M2 on the basis of the first relative position information and the second relative position information.

11 Claims, 8 Drawing Sheets

(52) U.S. Cl.
CPC ............... *B29C 2045/7633* (2013.01); *B29C 2945/7624* (2013.01); *B29C 2945/76083* (2013.01); *B29C 2945/76418* (2013.01); *B29C 2945/76568* (2013.01); *B29C 2945/76896* (2013.01)

(58) Field of Classification Search
CPC .. B29C 2945/7625; B29C 2945/76083; B29C 2045/7633; B29C 2045/4275; B29C 2945/76896
See application file for complete search history.

(56) References Cited

U.S. PATENT DOCUMENTS

| | | | | |
|---|---|---|---|---|
| 6,457,964 | B1* | 10/2002 | Yamaguchi | B29C 45/80 264/40.5 |
| 10,792,728 | B2* | 10/2020 | Oberoi | B64F 5/10 |
| 2003/0094733 | A1* | 5/2003 | Knepper | B29C 45/332 264/334 |
| 2003/0198701 | A1* | 10/2003 | Maru | B29C 45/0084 425/88 |
| 2004/0005372 | A1* | 1/2004 | Shirahata | B25J 9/1676 425/135 |
| 2005/0129794 | A1* | 6/2005 | Chao | B29C 45/5008 425/145 |
| 2006/0159800 | A1* | 7/2006 | Yamasaki | B29C 45/661 425/593 |
| 2006/0197248 | A1* | 9/2006 | Kato | B29C 45/661 264/40.5 |
| 2007/0186144 | A1* | 8/2007 | Stange | B29C 45/76 715/205 |
| 2007/0210740 | A1* | 9/2007 | Sato | B25J 9/1633 318/646 |
| 2008/0275593 | A1* | 11/2008 | Johansson | B29C 45/7626 700/245 |
| 2009/0216375 | A1* | 8/2009 | Audibert | G05B 19/41825 700/262 |
| 2009/0297648 | A1* | 12/2009 | Sicilia | B29C 45/7207 425/112 |
| 2010/0217434 | A1* | 8/2010 | Hellberg | B25J 9/1674 700/245 |
| 2012/0034330 | A1* | 2/2012 | Fujita | B29C 45/66 425/4 R |
| 2013/0061523 | A1* | 3/2013 | Mankame | B60J 7/022 49/26 |
| 2013/0313746 | A1* | 11/2013 | Ikarashi | G06N 20/00 |
| 2015/0205548 | A1* | 7/2015 | Suzuki | B29C 45/5008 425/135 |
| 2016/0185023 | A1* | 6/2016 | Lee | B25J 9/1633 318/646 |
| 2016/0274561 | A1* | 9/2016 | Stone | G06N 20/00 |
| 2018/0200965 | A1* | 7/2018 | Meess | B25J 9/1682 |
| 2018/0253080 | A1* | 9/2018 | Meess | G05B 19/4099 |

FOREIGN PATENT DOCUMENTS

| | | |
|---|---|---|
| JP | 2001-79910 A | 3/2001 |
| JP | 2001-154717 A | 6/2001 |
| JP | 2004-66682 A | 3/2004 |
| JP | 2007-083489 A | 4/2007 |
| JP | 2015-116790 A | 6/2015 |

\* cited by examiner

INJECTION MOLDING SYSTEM, INJECTION MOLDING MACHINE, AND PERIPHERAL DEVICE

This application is based on and claims the benefit of priority from Japanese Patent Application No. 2016-185863, filed on 23 Sep. 2016, the content of which is incorporated herein by reference.

BACKGROUND OF THE INVENTION

Field of the Invention

The present invention relates to an injection molding system having an injection molding machine and a peripheral device. Moreover, the present invention relates to an injection molding machine and a peripheral device that form the injection molding system.

Related Art

In recent years, an injection molding machine is combined with a peripheral device such as various robots and an additional injection device. For example, a peripheral device such as a robot for picking a molded article out of a mold and inserting an insert part into a mold and an additional injection device for performing multi-material molding are connected to an injection molding machine. The injection molding machine and the peripheral device form an injection molding system.

An injection molding machine has various movable parts. For example, the injection molding machine has various movable parts such as a mold clamping mechanism, an ejection mechanism, an injection mechanism, an injection device reciprocation mechanism, and a mold thickness adjustment mechanism. Moreover, the peripheral device has similar movable parts. For example, the robot has a movable part such as arms and hands. Moreover, the additional injection device has a movable part such as an injection device reciprocation mechanism.

Here, in the injection molding system, although the injection molding machine and the peripheral device operate in a linked manner, interference between the movable parts needs to be avoided.

Conventionally, since the movement of a movable part in an injection molding machine is linear, the position information of the movable part is one-dimensional position information indicating the relative position in relation to the origin on a movable range of the movable part. Moreover, when the peripheral device is linked with the injection molding machine, it is necessary to teach a picking position and an insert position to a robot that picks and inserts a molded article, for example.

In contrast, for example, an injection molding machine having a control unit capable of inputting the coordinates of a robot position after the robot is moved and adjusting a finished article picking position of the robot is disclosed (for example, see Patent Document 1).

Moreover, a molded article picking machine that stores CAD data of an injection molding machine and a mold and calculates movement position data of the picking machine on the basis of the CAD data to move a chuck is disclosed (for example, see Patent Document 2).

Patent Document 1: Japanese Unexamined Patent Application, Publication No. 2001-154717

Patent Document 2: Japanese Unexamined Patent Application, Publication No. 2015-116790

SUMMARY OF THE INVENTION

However, in the above-described technology, since the peripheral device such as a robot and a molded article picking machine and the injection molding machine operate on different coordinate systems, the mutual positional relation is unknown.

For example, although the nozzle of an additional injection device makes contact with the mold of an injection molding machine, since the positional relation between the mold and the additional injection device is unknown, the additional injection device is sometimes moved too much. In this case, the nozzle of the additional injection device may be caught in the mold and may be damaged.

Moreover, in the teaching operation, it is necessary to move the robot to a position appropriate for picking and inserting, for example, to teach the position to the robot. This operation requires a considerable amount of time.

An object of the present invention is to provide an injection molding system capable of easily calculating the relative position information between a movable part of an injection molding machine and a movable part of a peripheral device. Another object of the present invention is to provide an injection molding machine and a peripheral device that form the injection molding system.

(1) The present invention provides an injection molding system (for example, an injection molding system 1) including an injection molding machine (for example, an injection molding machine 2) and a peripheral device (for example, a robot 3) connected to the injection molding machine, wherein the injection molding machine includes: a first movable part (for example, a movable part 50); a first driving unit (for example, a driving unit 25) that moves the first movable part; a first control unit (for example, a first control unit 110) that calculates first relative position information on a relative position of a first movement position (for example, a first movement position M1) of the first movable part in relation to a first reference position (for example, a first reference position K1) of the injection molding machine; and a first output unit (for example, a first communication unit 130) that outputs the first relative position information calculated by the first control unit to the peripheral device, and the peripheral device includes: a second movable part (for example, a hand 65); a second driving unit (for example, a driving mechanism 60) that moves the second movable part; a second control unit (for example, a second control unit 210) that calculates second relative position information on a relative position of a second movement position (for example, a second movement position M2) of the second movable part in relation to a second reference position (for example, a second reference position K2) of the peripheral device; and a second output unit (for example, a second communication unit 230) that outputs the second relative position information calculated by the second control unit to the injection molding machine, inter-reference relative position information on a relative position between the first reference position and the second reference position is position information indicating the same position, predetermined position information, or position information calculated later, and at least one of the first control unit and the second control unit calculates inter-drive-unit relative position information on a relative position between the first movement position of the first driving unit and the second movement position of the second driving unit on the basis of at least the first relative position information and the second relative position information.

(2) In the injection molding system according to (1), the injection molding machine may include a first connection portion (for example, a first connection portion 80) connected to the peripheral device, the peripheral device may include a second connection portion (for example, a second connection portion 85) connected to the injection molding machine, the first reference position may be a predetermined position of the first connection portion, the second reference position may be a position corresponding to the first reference position of the second connection portion, the inter-reference relative position information may be position information indicating the same position, and at least one of the first control unit and the second control unit may calculate inter-drive-unit relative position information on a relative position between the first movement position of the first driving unit and the second movement position of the second driving unit on the basis of the first relative position information and the second relative position information.

(3) The present invention provides an injection molding machine (for example, an injection molding machine 2) connectable to a peripheral device (for example, a robot 3) including a second movable part (for example, a hand 65), a second driving unit (for example, a driving mechanism 60) that moves the second movable part, a second control unit that calculates second reference position information on a relative position of a second movement position of the second movable part in relation to a second reference position (for example, a second reference position K2) of the peripheral device, and a second output unit (for example, a second communication unit 230) that outputs the second relative position calculated by the second control unit, the injection molding machine including: a first movable part (for example, a movable part 50); a first driving unit (for example, a driving unit 25) that moves the first movable part; a first control unit (for example, a first control unit 110) that calculates first relative position information on a relative position of a first movement position (for example, a first movement position M1) of the first movable part in relation to a first reference position (for example, a first reference position K1) of the injection molding machine; and a first output unit (for example, a first communication unit) that outputs the first relative position information calculated by the first control unit to the peripheral device, inter-reference relative position information on a relative position between the first reference position of the injection molding machine and the second reference position of the peripheral device is position information indicating the same position, predetermined position information, or position information calculated later, and the first control unit calculates inter-drive-unit relative position information on a relative position between the first movement position of the first driving unit and the second movement position of the second driving unit on the basis of at least the first relative position information and the second relative position information.

(4) In the injection molding machine according to (3), the injection molding machine may include a first connection portion (for example, a first connection portion 80) connected to the peripheral device, the peripheral device may include a second connection portion (for example, a second connection portion 85) connected to the injection molding machine, the first reference position may be a predetermined position of the first connection portion, the second reference position may be a position corresponding to the first reference position of the second connection portion, the inter-reference relative position information may be position information indicating the same position, and the first control unit may calculate inter-drive-unit relative position information on a relative position between the first movement position of the first driving unit and the second movement position of the second driving unit on the basis of the first relative position information and the second relative position information.

(5) In the injection molding machine according to (3) or (4), the first control unit may instruct the first driving unit to perform an interference avoidance operation on the basis of the inter-drive-unit relative position information.

(6) In the injection molding machine according to (5), the first control unit may instruct the first driving unit to stop movement of the first movable part or change a moving direction of the first movable part as the interference avoidance operation.

(7) The injection molding machine according to any one of (3) to (6) may further include: a first notification unit (for example, a first notification unit 140), and the first control unit may instruct the first notification unit to output a predetermined notification on the basis of the inter-drive-unit relative position information.

(8) In the injection molding machine according to any one of (3) to (7), the first control unit may be configured to be able to calculate the first time-sequential relative position information on the basis of predetermined time-sequential position information of the first movable part and calculate the time-sequential inter-drive-unit relative position information on the basis of the second time-sequential relative position information output from the peripheral device and the first time-sequential relative position information.

(9) The present invention provides a peripheral device (for example, a robot 3) connectable to an injection molding machine (for example, an injection molding machine 2) including a first movable part (for example, a movable part 50), a first driving unit (for example, a driving unit 25) that moves the first movable part, a control unit that calculates first relative position information on a relative position of a first movement position (for example, a first movement position M1) of the first movable part in relation to a first reference position (for example, a first reference position K1) of the injection molding machine, and a first output unit (for example, a first communication unit 130) that outputs the first relative position information calculated by the first control unit, the peripheral device including: a second movable part (for example, a hand 65); a second driving unit (for example, a driving mechanism 60) that moves the second movable part; a second control unit (for example, a second control unit 210) that calculates second relative position information on a relative position of a second movement position (for example, a second movement position M2) of the second movable part in relation to a second reference position (for example, a reference position K2) of the peripheral device, and a second output unit (for example, a second communication unit 230) that outputs the second relative position information calculated by the second control unit to the injection molding machine, inter-reference relative position information on a relative position between the first reference position of the injection molding machine and the second reference position of the peripheral device is position information indicating the same position, predetermined position information, or position information calculated later, and the second control unit calculates inter-drive-unit relative position information on a relative position between the first movement position of the first driving unit and the second movement position of the second driving unit on the basis of at least the first relative position information and the second relative position information.

(10) In the peripheral device according to (9), the injection molding machine may include a first connection portion (for example, a first connection portion 80) connected to the peripheral device, the peripheral device may include a second connection portion (for example, a second connection portion 85) connected to the injection molding machine, the first reference position may be a predetermined position of the first connection portion, the second reference position may be a position corresponding to the first reference position of the second connection portion, the inter-reference relative position information may be position information indicating the same position, and the second control unit may calculate inter-drive-unit relative position information on a relative position between the first movement position of the first driving unit and the second movement position of the second driving unit on the basis of the first relative position information and the second relative position information.

(11) In the peripheral device according to (9) or (10), the second control unit may instruct the second driving unit to perform an interference avoidance operation on the basis of the inter-drive-unit relative position information.

(12) In the peripheral device according to (11), the second control unit may instruct the second driving unit to stop movement of the second movable part or change a moving direction of the second movable part as the interference avoidance operation.

(13) The peripheral device according to any one of (9) to (12) may further include: a second notification unit (for example, a second notification unit 240), and the second control unit may instruct the second notification unit to output a predetermined notification on the basis of the inter-drive-unit relative position information.

(14) In the peripheral device according to any one of (9) to (13), the second control unit may be configured to be able to calculate the second time-sequential relative position information on the basis of predetermined time-sequential position information of the second movable part and calculate the time-sequential inter-drive-unit relative position information on the basis of the first time-sequential relative position information output from the injection molding machine and the second time-sequential relative position information.

According to the present invention, it is possible to provide an injection molding system capable of easily calculating the relative position information between a movable part of an injection molding machine and a movable part of a peripheral device. According to the present invention, it is possible to provide an injection molding machine and a peripheral device that form the injection molding system.

DETAILED DESCRIPTION OF THE INVENTION

Figure 1:
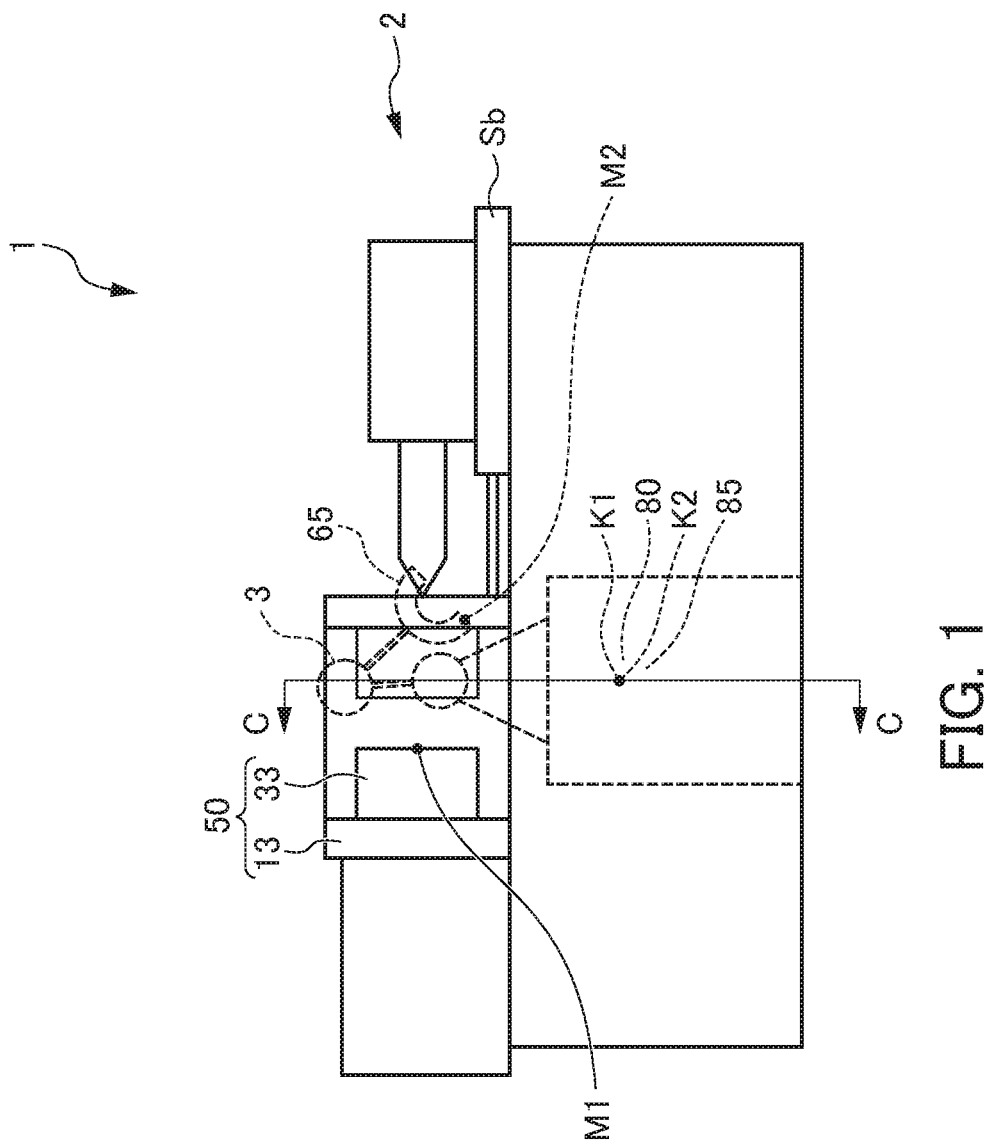
FIG. 1 is a diagram illustrating an injection molding system according to a first embodiment.

Hereinafter, an embodiment of the present invention will be described with reference to the drawings. In the description of the second embodiment and the like, constituent elements common to those of the first embodiment will be denoted by the same reference numerals and the description thereof will be omitted.

First Embodiment

First, an injection molding system 1 will be described with reference to FIG. 1. FIG. 1 is a diagram illustrating an injection molding system of the first embodiment. As illustrated in FIG. 1, the injection molding system 1 includes an injection molding machine 2 and a robot 3 (a peripheral device) connected to the injection molding machine 2. In the injection molding system 1, the injection molding machine 2 and the robot 3 are connected together. In the injection molding system 1, the injection molding machine 2 and the robot 3 operate in a linked manner.

In the present embodiment, in the injection molding machine 2, a first reference position K1 is set to a predetermined position of a first connection portion 80, and a first movement position M1 is set to a predetermined position of a movable mold 33.

In the robot 3, a second reference position K2 is set to a position corresponding to the first reference position K1 during connection of a second connection portion 85, and a second movement position M2 is set to a predetermined position of a hand 65.

The first reference position K1, the second reference position K2, the first movement position M1, and the second movement position M2 are set to calculate inter-movable-part relative position information indicating the relative position between the first movement position M1 (the movable mold 33 and the movable part 50) and the second movement position M2 (the hand 65). Calculation of the inter-movable-part relative position information will be described in detail later.

Figure 2:
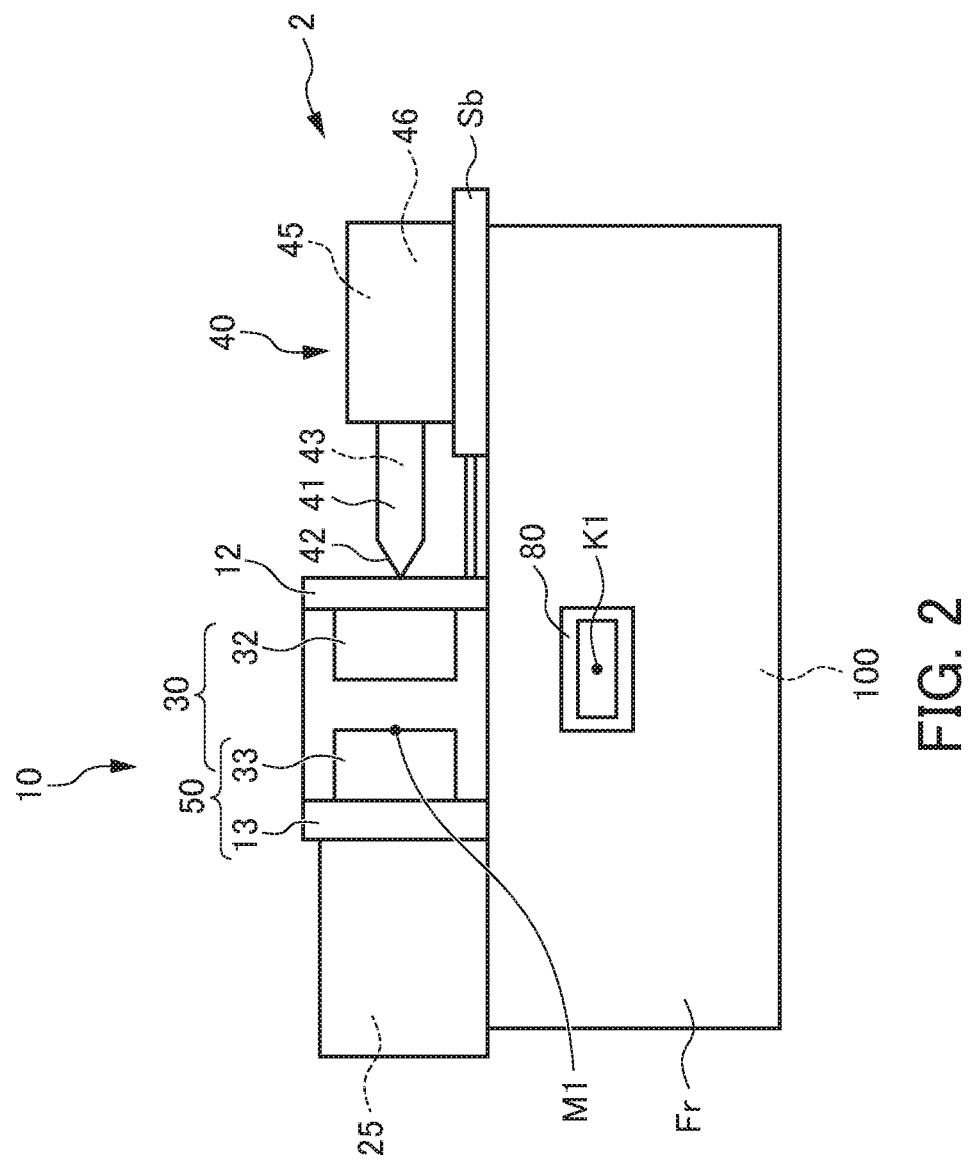
FIG. 2 is a diagram illustrating an injection molding machine according to the first embodiment.
Figure 3:
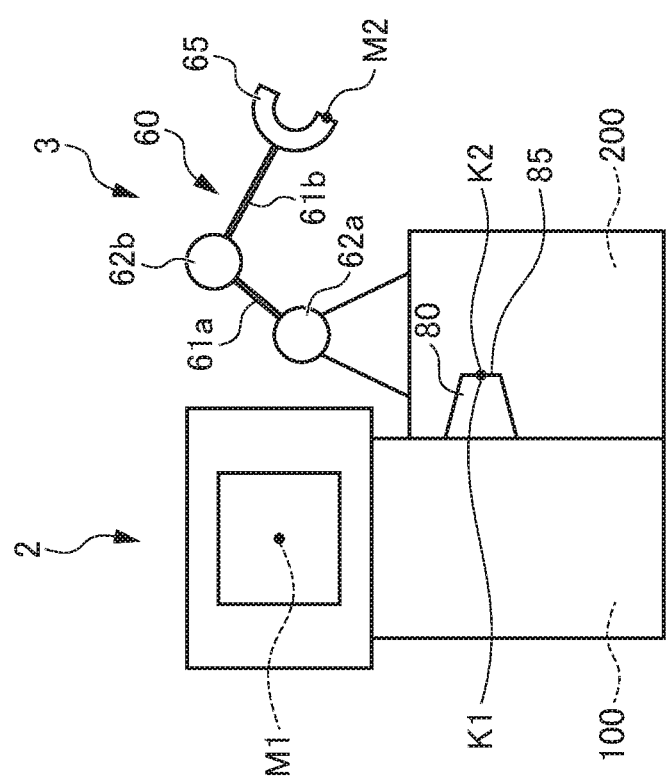
FIG. 3 is a cross-sectional view along line C-C in FIG. 1.
Figure 4:
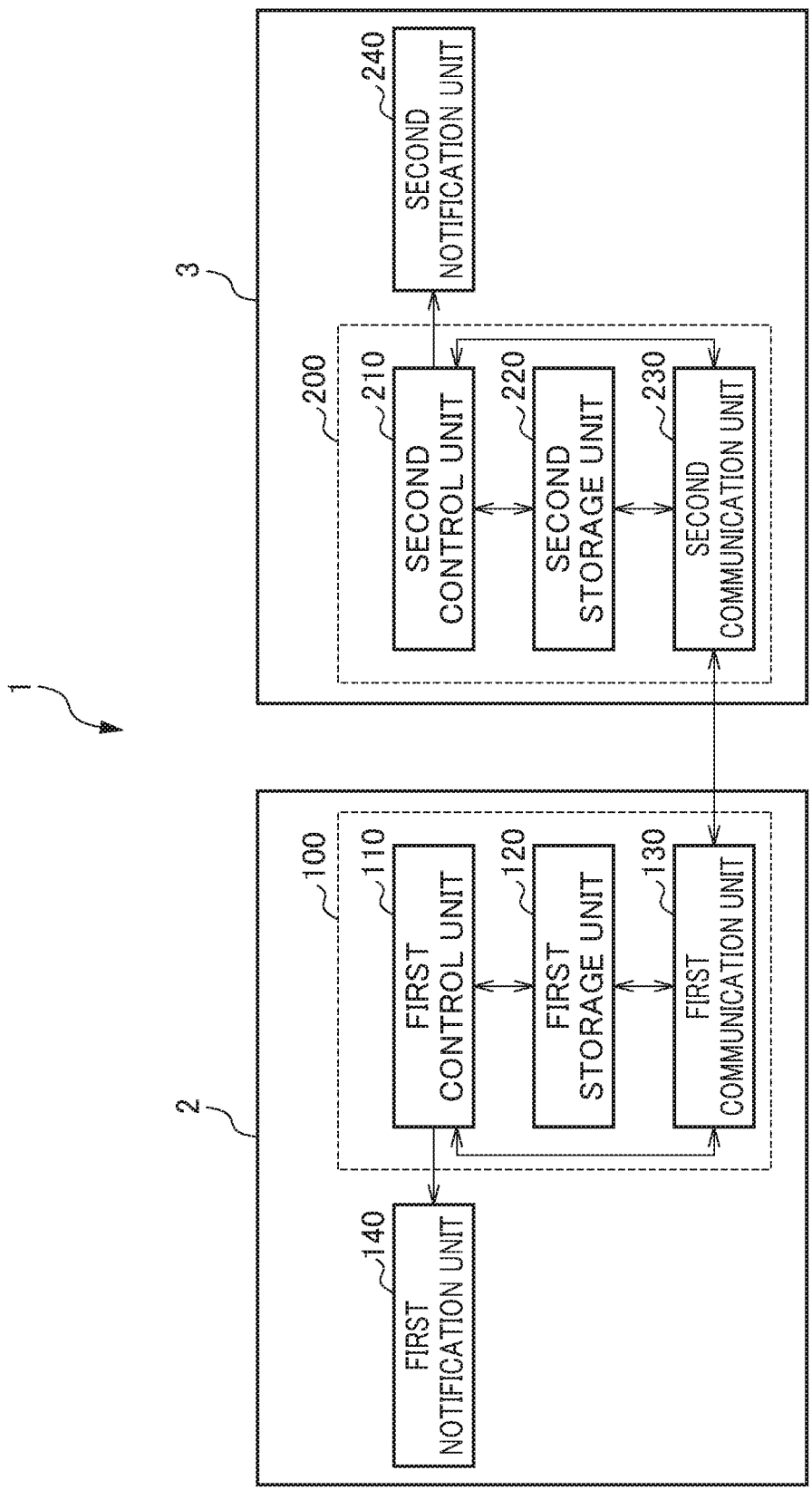
FIG. 4 is a control block diagram of the first embodiment.

Next, the injection molding machine 2 and the robot 3 (the peripheral device) will be described with reference to FIGS. 2 to 4. FIG. 2 is a diagram illustrating the injection molding machine 2 of the first embodiment. FIG. 3 is a cross-sectional view along line C-C in FIG. 1. FIG. 4 is a control block diagram of the first embodiment.

As illustrated in FIGS. 2 and 3, the injection molding machine 2 includes a frame Fr, a mold clamping device 10, a mold 30, an injection device 40, the first connection portion 80, and a first controller 100. Here, the first controller 100 will be described later. In the injection molding machine 2, the first reference position K1 is set to a predetermined position of the first connection portion 80, and the first movement position M1 is set to a predetermined position of the movable mold 33.

The frame Fr is a frame which is mounted on a floor or the like and on which the mold clamping device 10 and the injection device 40 are mounted.

The mold clamping device 10 has a fixed platen 12, a movable platen 13, and a driving unit 25 (a first driving unit). The mold clamping device 10 closes, clamps, and opens the mold 30.

The fixed platen 12 is fixed to the frame Fr. A fixed mold 32 is attached to a surface of the fixed platen 12 facing the movable platen 13.

The movable platen 13 is disposed so as to be movable along a guide (for example, a guide rail) arranged on the frame Fr. The movable platen 13 is disposed so as to be movable toward and away from the fixed platen 12. A movable mold 33 (to be described later) is attached to a surface of the movable platen 13 close to the fixed platen 12. When the movable platen 13 moves toward and away from the fixed platen 12, the mold 30 is closed, clamped, and opened.

The driving unit 25 includes a rear platen, a tie bar, a toggle mechanism, a mold clamping motor, a movement conversion mechanism, and the like which are not illustrated. The driving unit 25 (a first driving unit) moves a movable part 50 (a first movable part). The driving unit 25 (for example, a mold clamping motor) is controlled by the first controller 100 to be described later.

The tie bar couples the fixed platen 12 and the rear platen together. The tie bar is disposed in parallel to a mold opening/closing direction (a horizontal direction in FIG. 2). Moreover, the tie bar extends according to a clamping force. A clamping force detector is disposed in the tie bar. The clamping force detector detects the clamping force by detecting strain of the tie bar.

The toggle mechanism is arranged between the movable platen 13 and the rear platen. The toggle mechanism includes a crosshead, a plurality of links, and the like which are not illustrated. When the toggle mechanism allows the crosshead to advance and retract, the plurality of links are bent and the movable platen 13 advances and retracts.

The mold clamping motor allows the crosshead to advance and retract with the aid of the movement conversion mechanism to allow the movable platen 13 to advance and retract. The movement conversion mechanism converts rotation movement output from the mold clamping motor to linear movement and transmits the linear movement to the crosshead.

The mold 30 has the fixed mold 32 and the movable mold 33. The fixed mold 32 is attached to a surface of the fixed platen 12 close to the movable platen 13. The movable mold 33 is attached to a surface of the movable platen 13 close to the fixed platen 12. The movable mold 33 forms the movable part 50 (the first movable part) together with the movable platen 13. The mold 30 is closed, clamped, and opened by the mold clamping device 10.

The injection device 40 has a cylinder 41, a nozzle 42, a screw 43, a metering motor 45, and an injection motor 46. The injection device 40 is disposed on a slide base Sb disposed on an upper surface of the frame Fr so as to be able to advance and retract (in a horizontal direction in FIG. 2). The injection device 40 (the nozzle 42) is in contact with the mold 30 to fill a molding material into the mold 30.

The cylinder 41 heats the molding material supplied from a supply port (not illustrated). A heating unit such as a heater is disposed on the outer circumference of the cylinder 41.

The nozzle 42 is provided at a front end of the cylinder 41. The nozzle 42 is a portion that is pressed against the mold 30.

The screw 43 is disposed inside the cylinder 41. The screw 43 is disposed so as to be able to rotate and advance and retract within the cylinder 41. The screw 43 melts the molding material and moves the melted molding material toward the mold 30.

The metering motor 45 is a motor that rotates the screw 43. The metering motor 45 melts the molding material by rotating the screw 43.

The injection motor 46 is a motor that allows the screw 43 to advance and retract. The injection motor 46 allows the screw 43 to move forward (toward the mold 30) whereby a liquid molding material accumulated on the forward side of the screw 43 is filled into the mold 30.

The first connection portion 80 is formed on a side surface (the front surface in FIG. 2) of the injection molding machine 2. The first connection portion 80 is a portion that is connected to the second connection portion 85 of the robot 3 to be described later.

In the injection molding machine 2, the first reference position K1 is set to a predetermined position of the first connection portion 80, and the first movement position M1 is set to a predetermined position of the movable mold 33. The first reference position K1 is an arbitrary position of the injection molding machine 2, and in the present embodiment, is set to the first connection portion 80. In the present embodiment, the first reference position K1 is set to a position corresponding to the second reference position K2 set to the second connection portion 85 of the robot 3 to be described later. For example, the first reference position K1 is set to a position of coming into contact with the second reference position K2 in a state in which the injection molding machine 2 and the robot 3 are connected.

The first movement position M1 is an arbitrary position of the movable part of the injection molding machine 2, and in the present embodiment, is set to the movable mold 33 (the movable part 50). In the present embodiment, the first movement position M1 is set to a position corresponding to the second reference position K2 set to the hand 65 of the robot 3 to be described later. For example, the first movement position M1 is set to a position at which the second movement position M2 is at the closest when the hand 65 picks a molded article.

As illustrated in FIG. 3, the robot 3 includes a driving mechanism 60 (the second driving unit), the hand 65 (the second movable part), the second connection portion 85, and a second controller 200. The second controller 200 will be described in detail later. In the robot 3, the second reference position K2 is set to a position corresponding to the first reference position K1 during connection of the second connection portion 85, and the second movement position M2 is set to a predetermined position of the hand 65.

The driving mechanism 60 has arms 61a and 61b and second driving units 62a and 62b. The driving mechanism 60 is coupled to the hand 65. The driving mechanism 60 (the second driving unit) is a mechanism that moves the hand 65 (the second movable part).

The arms 61a and 61b are rod-shaped members driven by the second driving units 62a and 62b, respectively. The arm 61a is disposed between the second driving unit 62a and the second driving unit 62b. The arm 61b is disposed between the second driving unit 62b and the hand 65.

The second driving units 62a and 62b drive the arms 61a and 61b, respectively. The second driving units 62a and 62b move the hand 65 to the predetermined positions by driving the arms 61a and 61b, respectively. The arms 61a and 61b move the hand 65 at a position for picking a molded article, for example. The second driving units 62a and 62b are controlled by the second controller 200 so that the hand 65 performs a predetermined operation.

The hand 65 is moved at predetermined timings to a plurality of predetermined positions by the driving mechanism 60. Moreover, the hand 65 is configured to be able to perform an opening/closing operation (a grasping/releasing operation) with the aid of a hand driving unit (not illustrated). The hand 65 is moved by the driving mechanism 60 and is opened and closed by the hand driving unit, whereby an operation of moving the hand 65 to a picking position close to the movable mold 33 to pick a molded article from the movable mold 33 and moving the hand 65 to a predetermined position to release the molded article (deliver the molded article to a mounting place) can be performed repeatedly. Here, the second movement position M2 is set to the hand 65 (the second movable part).

The second connection portion 85 is formed on the robot 3 (a lower-side stand) close to the injection molding machine 2. The second connection portion 85 is a portion connected to the first connection portion 80 of the injection molding machine 2.

In the robot 3, the second reference position K2 is set to a position corresponding to the first reference position K1 during connection of the second connection portion 85, and the second movement position M2 is set to a predetermined position of the hand 65. The second reference position K2 is an arbitrary position of the robot 3, and in the present embodiment, is set to the second connection portion 85. In the present embodiment, the second reference position K2 is set to a position corresponding to the first reference position K1 set to the first connection portion 80 of the injection molding machine 2. For example, the second reference position K2 is set to a position of coming into contact with the first reference position K1 in a state in which the injection molding machine 2 and the robot 3 are connected.

The second movement position M2 is an arbitrary position of the movable part of the robot 3, and in the present embodiment, is set to the hand 65. In the present embodiment, the second movement position M2 is set to a position corresponding to the first reference position K1 set to the movable mold 33. For example, the second movement position M2 is set to a position that is closest to the first movement position M1 when the hand 65 picks a molded article.

Next, a control block of the injection molding system 1 will be described with reference to FIG. 4. The injection molding system 1 includes the first controller 100 and a first notification unit 140 which are disposed close to the injection molding machine 2 and the second controller 200 and a second notification unit 240 which are disposed close to the robot 3.

The first controller 100 includes a first control unit 110, a first storage unit 120, and a first communication unit 130.

The first control unit 110 is configured to be able to calculate inter-drive-unit relative position information on the relative position between the first movement position M1 set to the movable part 50 of the injection molding machine 2 and the second movement position M2 set to the hand 65 of the robot 3.

Specifically, the first control unit 110 is configured to be able to calculate first relative position information (for example, {Xm1, Ym1, Zm1}) on the relative position of the first movement position M1 of the movable part 50 (the first movable part) in relation to the first reference position K1. The first control unit 110 is configured to be able to calculate the first relative position information continuously or intermittently.

The first control unit 110 is configured to be able to acquire or calculate inter-reference relative position information on the relative position between the first reference position K1 and the second reference position K2. Here, the inter-reference relative position information on the relative position between the first reference position K1 and the second reference position K2 is position information (contact arrangement) indicating the same position, predetermined position information (for example, stored in the first storage unit 120), or position information (for example, acquired from a distance measuring sensor or the like (not illustrated)) that can be calculated later. In the present embodiment, the inter-reference relative position information is the position information (contact arrangement) indicating the same position.

The first control unit 110 is configured to be able to acquire second relative position information (for example, {Xm2, Ym2, Zm2}) on the relative position of the second movement position M2 in relation to the second reference position K2 from the second controller 200 (the second control unit 210) of the robot 3 via the first communication unit 130 to be described later.

The first control unit 110 calculates inter-drive-unit relative position information (for example, {Xra, Yra, Zra}) on the relative position between the first movement position M1 set to the movable part 50 of the injection molding machine 2 and the second movement position M2 set to the hand 65 of the robot 3 on the basis of the inter-reference relative position information, the first relative position information, and the second relative position information.

In the present embodiment, since the inter-reference relative position information is information indicating the same position (contact position), the first control unit 110 calculates the inter-drive-unit relative position information on the basis of the first relative position information and the second relative position information. For example, the first control unit 110 calculates the inter-drive-unit relative position information as follows (Equation 1).

$$\{Xra,Yra,Zra\}=\{Xm1,Ym1,Zm1\}-\{Xm2,Ym2,Zm2\} \quad \text{(Equation 1)}$$

Here, when the first reference position K1 and the second reference position K2 are separated from each other, the first control unit 110 calculates the inter-drive-unit relative position information on the basis of the predetermined inter-reference relative position information stored in advance in the first storage unit 120 to be described later, the first relative position information, and the second relative position information.

Furthermore, when the first reference position K1 and the second reference position K2 are separated from each other, the first control unit 110 calculates the inter-reference relative position information using the information or the like acquired by various distance measuring sensors and calculates the inter-drive-unit relative position information on the basis of the first reference position and the second reference position.

The first control unit 110 controls the respective driving units. For example, the first control unit 110 instructs the driving unit 25 (the first driving unit) to perform an interference avoidance operation on the basis of the inter-drive-unit relative position information. Specifically, the first control unit 110 instructs the driving unit 25 (the first driving unit) to perform the interference avoidance operation when the distance calculated on the basis of the inter-drive-unit relative position information is equal to or smaller than a predetermined value. The first control unit 110 instructs the driving unit 25 (the first driving unit) to perform the interference avoidance operation when any one of the distances calculated for each vector on the basis of the inter-drive-unit relative position information is equal to or smaller than a predetermined value.

The first control unit 110 instructs the driving unit 25 to stop movement of the movable part 50 or change the moving direction of the movable part 50 (to move in the opposite direction) as the interference avoidance operation.

The first control unit 110 is configured to instruct the first notification unit 140 to be described later to output a predetermined notification before or simultaneously with the interference avoidance operation. The first control unit 110 instructs the first notification unit 140 to output a predetermined notification when the distance calculated on the basis of the inter-drive-unit relative position information is equal to or smaller than a predetermined value. The first control unit 110 instructs the first notification unit 140 to output a predetermined notification when any one of the distance calculated for each vector on the basis of the inter-drive-unit relative position information is equal to or smaller than a predetermined value.

The first control unit 110 is configured to be able to calculate the first time-sequential relative position information of the movable part 50 on the basis of predetermined time-sequential position information (for example, position information and operating conditions) of the movable part 50 (the first movable part). That is, the first control unit 110 is configured to be able to simulate a moving trajectory of the first movement position M1.

Furthermore, the first control unit 110 is configured to be able to calculate time-sequential inter-drive-unit relative position information on the basis of the second time-sequential relative position information of the hand 65 output from the robot 3 (the peripheral device) and the first time-sequential relative position information. That is, the first control unit 110 is configured to be able to simulate the positional relation between the first movement position M1 and the second movement position M2.

The first control unit 110 is configured to be able to ascertain a point at which the first movement position M1 and the second movement position M2 are positioned at a predetermined distance or smaller on the basis of the simulation of the positional relation between the first movement position M1 and the second movement position M2. The first control unit 110 instructs the first notification unit 140 to notify of the point, for example, at which the first movement position M1 and the second movement position M2 are positioned at a predetermined distance or smaller. For example, when the first notification unit 140 is a monitor, the first control unit 110 is configured to be able to display the trajectories of the first movement position M1 and the second movement position M2 on the monitor, for example, and to highlight the point at which the mutual distance is equal to or smaller than the predetermined distance.

The first storage unit 120 stores the inter-reference relative position information on the relative position between the first reference position K1 and the second reference position K2. In the present embodiment, since the first reference position K1 and the second reference position K2 are in contact with each other, the inter-reference relative position information is information indicating the same position. The first storage unit 120 stores predetermined position information when the first reference position K1 and the second reference position K2 are separated from each other.

The first storage unit 120 stores predetermined time-sequential position information (position information and operating conditions) of the movable part 50.

The first communication unit 130 (a first output unit) is configured to be able to output the first reference position calculated by the first control unit 110 to the robot 3. Moreover, the first communication unit 130 is configured to be able to acquire the second relative position information output from the robot 3.

The first communication unit 130 is configured to be able to output the first time-sequential relative position information calculated by the first control unit 110 to the robot 3. Moreover, the first communication unit 130 is configured to be able to acquire the second time-sequential relative position information output from the robot 3.

The first notification unit 140 performs various notifications on the basis of the instructions from the first control unit 110. The first notification unit 140 is an audio output unit, a lighting unit, or a monitor, for example. The first notification unit 140 sounds an alarm buzzer, turns a light on and off, or displays a warning according to the type thereof on the basis of the instruction from the first control unit 110.

Moreover, the first notification unit 140 (the monitor) displays the trajectories of the first movement position M1 and the second movement position M2, for example, and highlights the point at which the mutual distance is equal to or smaller than the predetermined distance when the first control unit 110 instructs the first notification unit 140 to notify of the point at which the first movement position M1 and the second movement position M2 are at the predetermined distance or smaller.

The second controller 200 includes a second control unit 210, a second storage unit 220, and a second communication unit 230. The second controller 200 has the same configuration as the first controller 110 and the respective constituent elements have the same functions.

The second control unit 210 is configured to be able to calculate inter-drive-unit relative position information on the relative position between the second movement position M2 set to the hand 65 of the robot 3 and the first movement position M1 set to the movable part 50 of the injection molding machine 2.

Specifically, the second control unit 210 is configured to be able to calculate the second relative position information (for example, {Xm2, Ym2, Zm2}) on the relative position of the second movement position M2 of the hand 65 (the second movable part) in relation to the second reference position K2. The second control unit 210 is configured to be able to calculate the second relative position information continuously or intermittently.

The second control unit 210 is configured to be able to acquire or calculate inter-reference relative position information on the relative position between the first reference position K1 and the second reference position K2. Here, the inter-reference relative position information on the relative position between the first reference position K1 and the second reference position K2 is position information (contact arrangement) indicating the same position, predetermined position information (for example, stored in the second storage unit 220), or position information (for example, acquired from a distance measuring sensor or the like (not illustrated)) that can be calculated later. In the present embodiment, the inter-reference relative position information is the position information (contact arrangement) indicating the same position.

The second control unit 210 is configured to be able to acquire first relative position information (for example, {Xm1, Ym1, Zm1}) on the relative position of the first movement position M1 in relation to the first reference position K1 from the first controller 100 (the first control unit 110) of the injection molding machine 2 via the second communication unit 230 to be described later.

The second control unit 210 calculates inter-drive-unit relative position information (for example, {Xra, Yra, Zra}) on the relative position between the first movement position M1 set to the movable part 50 of the injection molding machine 2 and the second movement position M2 set to the hand 65 of the robot 3 on the basis of the inter-reference relative position information, the first relative position information, and the second relative position information. In the present embodiment, since the inter-reference relative position information is information indicating the same position (contact position), the second control unit 210 calculates the inter-drive-unit relative position information on the basis of the first relative position information and the second relative position information. For example, the second control unit 210 calculates the inter-drive-unit relative position information as above (Equation 1).

Here, when the first reference position K1 and the second reference position K2 are separated from each other, the second control unit 210 calculates the inter-drive-unit relative position information on the basis of the predetermined inter-reference relative position information stored in advance in the second storage unit 220 to be described later, the first relative position information, and the second relative position information.

Furthermore, when the first reference position K1 and the second reference position K2 are separated from each other, the second control unit 210 calculates the inter-reference relative position information using the information or the like acquired by various distance measuring sensors and calculates the inter-drive-unit relative position information on the basis of the first reference position and the second reference position.

The second control unit 210 controls the respective driving units. For example, the second control unit 210 instructs the driving unit 60 (the second driving unit) to perform an interference avoidance operation on the basis of the inter-drive-unit relative position information. Specifically, the first control unit 110 instructs the driving unit 60 (the second driving unit) to perform the interference avoidance operation when the distance calculated on the basis of the inter-drive-unit relative position information is equal to or smaller than a predetermined value. The second control unit 210 instructs the driving unit 60 (the second driving unit) to perform the interference avoidance operation when any one of the distances calculated for each vector on the basis of the inter-drive-unit relative position information is equal to or smaller than a predetermined value.

The first control unit 110 instructs the driving unit 60 to stop movement of the hand 65 or change the moving direction of the hand 65 as the interference avoidance operation.

The first control unit 110 is configured to instruct the second notification unit 240 to be described later to output a predetermined notification before or simultaneously with the interference avoidance operation. The second control unit 210 instructs the second notification unit 240 to output a predetermined notification when the distance calculated on the basis of the inter-drive-unit relative position information is equal to or smaller than a predetermined value. The second control unit 210 instructs the second notification unit 240 to output a predetermined notification when any one of the distance calculated for each vector on the basis of the inter-drive-unit relative position information is equal to or smaller than a predetermined value.

The second control unit 210 is configured to be able to calculate the second time-sequential relative position information of the hand 65 on the basis of predetermined time-sequential position information (for example, position information and operating conditions) of the hand 65 (the second movable part). That is, the second control unit 210 is configured to be able to simulate a moving trajectory of the second movement position M2.

Furthermore, the second control unit 210 is configured to be able to calculate time-sequential inter-drive-unit relative position information on the basis of the first time-sequential relative position information of the movable part 50 output from the injection molding machine 2 and the second time-sequential relative position information. That is, the first control unit 110 is configured to be able to simulate the positional relation between the first movement position M1 and the second movement position M2.

The second control unit 210 is configured to be able to ascertain a point at which the first movement position M1 and the second movement position M2 are positioned at a predetermined distance or smaller on the basis of the simulation of the positional relation between the first movement position M1 and the second movement position M2. The second control unit 210 instructs the second notification unit 240 to notify of the point, for example, at which the first movement position M1 and the second movement position M2 are positioned at a predetermined distance or smaller. For example, when the second notification unit 240 is a monitor, the second control unit 210 is configured to be able to display the trajectories of the first movement position M1 and the second movement position M2 on the monitor, for example, and to highlight the point at which the mutual distance is equal to or smaller than the predetermined distance.

The second storage unit 220 stores the inter-reference relative position information on the relative position between the first reference position K1 and the second reference position K2. In the present embodiment, since the first reference position K1 and the second reference position K2 are in contact with each other, the inter-reference relative position information is information indicating the same position. The second storage unit 220 stores predetermined position information when the first reference position K1 and the second reference position K2 are separated from each other.

The second storage unit 220 stores predetermined time-sequential position information (position information and operating conditions) of the hand 65.

The second communication unit 230 (a second output unit) is configured to be able to output the second reference position calculated by the second control unit 210 to the injection molding machine 2. Moreover, the second communication unit 230 is configured to be able to acquire the first relative position information output from the injection molding machine 2.

The second communication unit 230 is configured to be able to output the second time-sequential relative position information calculated by the second control unit 210 to the injection molding machine 2. Moreover, the second communication unit 230 is configured to be able to acquire the first time-sequential relative position information output from the injection molding machine 2.

The second notification unit 240 performs various notifications on the basis of the instructions from the second control unit 210. The second notification unit 240 is an audio output unit, a lighting unit, or a monitor, for example. The second notification unit 240 sounds an alarm buzzer, turns a light on and off, or displays a warning according to the type thereof on the basis of the instruction from the second control unit 210.

Moreover, the second notification unit 240 (the monitor) displays the trajectories of the first movement position M1 and the second movement position M2, for example, and highlights the point at which the mutual distance is equal to or smaller than the predetermined distance when the second control unit 210 instructs the second notification unit 240 to notify of the point at which the first movement position M1 and the second movement position M2 are at the predetermined distance or smaller.

Figure 5:
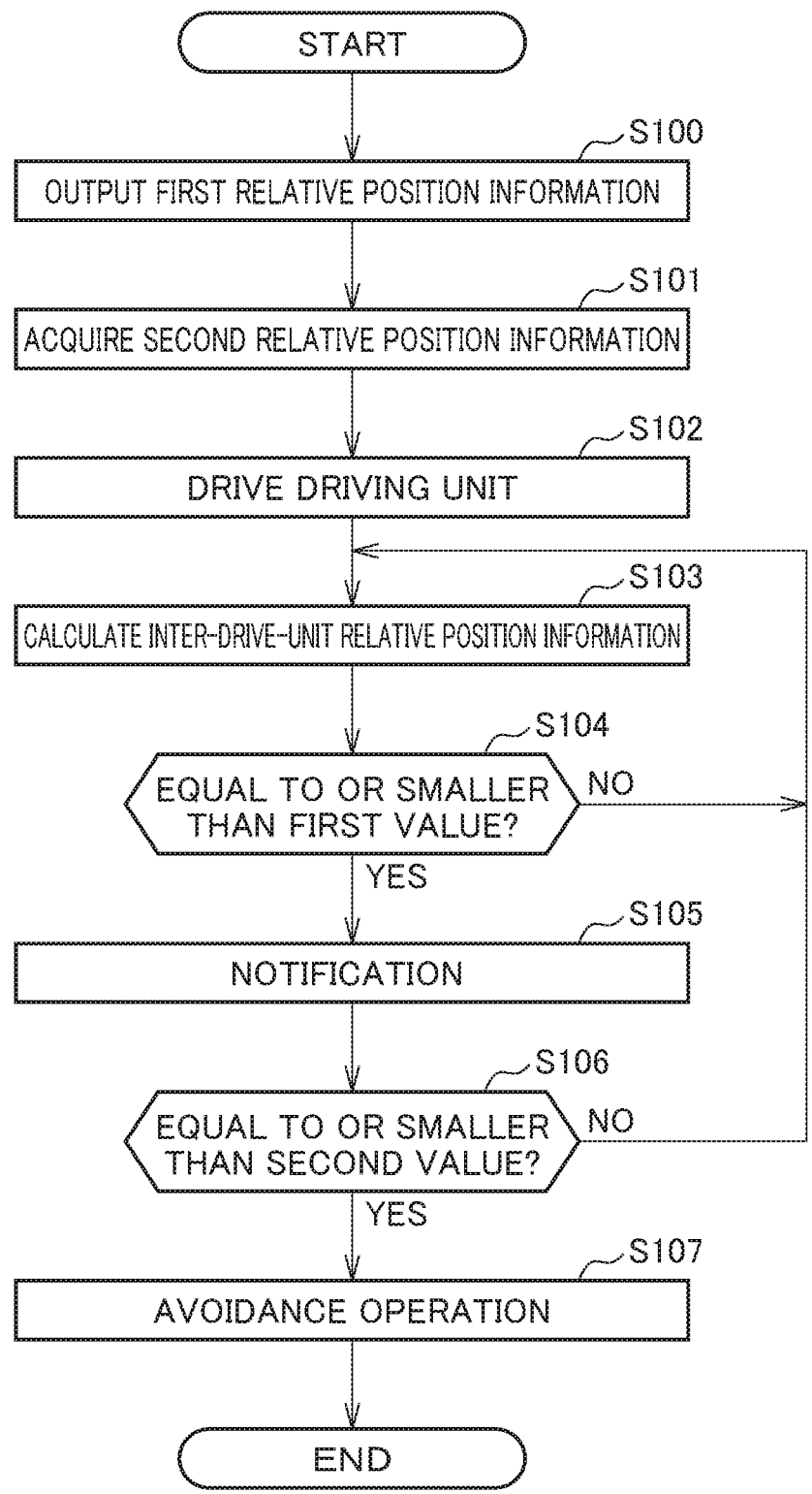
FIG. 5 is a flowchart for describing an operation of an injection molding machine according to the first embodiment.

Next, the operation of the injection molding machine 2 will be described with reference to FIG. 5. FIG. 5 is a flowchart for describing the operation of the injection molding machine according to the first embodiment. Hereinafter, although the operation of the injection molding machine 2 will be described, the operation of the robot 3 is similar, and the description of the injection molding machine 2 can be quoted.

As illustrated in FIG. 5, in step S100, the first control unit 110 continuously calculates the first relative position information and continuously outputs the calculated first relative position information to the robot 3 via the first communication unit 130.

Subsequently, in step S101, the first control unit 110 continuously acquires the second relative position information output from the robot 3 via the first communication unit 130.

Subsequently, in step S102, the first control unit 110 drives the driving unit 25 so as to open or close the mold 30 at a predetermined timing.

In step S103, the first control unit 110 continuously calculates the inter-drive-unit relative position information on the basis of the calculated first relative position information and the acquired second relative position information.

In step S104, the first control unit 110 causes the first notification unit 140 to output a predetermined notification when it is determined that the distance between the driving units calculated on the basis of the inter-drive-unit relative position information is equal to or smaller than a predetermined first value (YES). When it is not determined that the distance between the driving units calculated on the basis of the inter-drive-unit relative position information is equal to or smaller than the predetermined first value (NO), the first control unit 110 returns the process to step S103.

In step S105, the first notification unit 140 outputs a predetermined notification on the basis of an instruction from the first control unit.

Subsequently, in step S106, after the distance between the driving units calculated on the basis of the inter-drive-unit relative position information is equal to or smaller than the predetermined first value, when it is further determined that the distance is equal to or smaller than a second value lower than the first position (YES), the first control unit 110 instructs the driving unit 25 to perform a predetermined interference avoidance operation. When it is not determined that the distance between the driving units calculated on the basis of the inter-drive-unit relative position information is equal to or smaller than the second value (NO), the first control unit 110 returns the process to step S103.

In step S107, the driving unit 25 performs a predetermined interference avoidance operation on the basis of an instruction from the first control unit 110. For example, the driving unit 25 moves the movable part 50 (the movable mold 33) in the direction (toward the left side in FIG. 2) further away from the fixed mold 32. The robot 3 moves the hand 65 in the direction further away from the movable part 50 (the movable mold 33).

According to the present embodiment, the following advantages are obtained. According to the present embodiment, it is possible to provide an injection molding system capable of easily calculating the relative position information between the movable part of the injection molding machine and the movable part of the peripheral device. According to the present embodiment, it is possible to provide the injection molding machine and the peripheral device that form the injection molding system.

According to the present embodiment, the injection molding machine calculates the first relative position information between the first reference position set to the injection molding machine and the first movement position set to the first movable part (the movable part 50), and the peripheral device (the robot 3) calculates the second relative position information between the second reference position set to the peripheral device and the second movable part (the hand 65). The injection molding machine and the peripheral device each can calculate the inter-drive-unit relative position information on the relative position between the first movement position and the second movement position on the basis of the inter-reference relative position information (in the present embodiment, the information indicating the same position) on the relative position between the first reference position and the second reference position, the first relative position information, and the second relative position information.

In this way, the injection molding machine and the peripheral device each are configured to be able to recognize the distance between the movable parts without performing adjustment such as adjusting the installed positions or the like and inputting the coordinates of the installed positions. In this way, it is possible for the injection molding machine and the peripheral device to avoid collision of the movable parts (for example, collision of the hand and the mold) without performing complex adjustments.

According to the present embodiment, the first reference position is set to the first connection portion 80 of the injection molding machine and the second reference position is set to the second connection portion 85 of the peripheral device (the robot 3). Due to this, the inter-reference relative position information is information indicating the same position. In this way, the injection molding machine and the peripheral device can calculate the inter-drive-unit relative position information on the basis of the first relative position information and the second position information only. In this way, it is possible to avoid collision of the movable parts (for example, collision of the hand and the mold) without performing more complex adjustments.

In the present embodiment, the injection molding machine and the peripheral device instruct the first driving unit (the driving unit 25) and the second driving unit (the driving mechanism 60), respectively, to perform the interference avoidance operation on the basis of the inter-movable-part relative position information. For example, the injection molding machine and the peripheral device instruct the first driving unit (the driving unit 25) and the second driving unit (the driving mechanism 60), respectively, to perform the interference avoidance operation when the distance calculated on the basis of the inter-movable-part relative position information is equal to or smaller than a predetermined value. In this way, the injection molding machine and the peripheral device can avoid collision of the movable parts (for example, collision of the hand and the mold) more reliably.

In the present embodiment, the injection molding machine and the peripheral device instruct the first driving unit (the driving unit 25) and the second driving unit (the driving mechanism 60), respectively, to stop movement of the first movable part and/or the second movable part or change the moving direction of the first movable part and/or the second movable part on the basis of the inter-movable-part relative position information as the interference avoidance operation. In this way, the injection molding machine and the peripheral device can avoid collision of the movable parts (for example, collision of the hand and the mold) more reliably.

In the present embodiment, the injection molding machine and the peripheral device have the first notification unit and the second notification unit, respectively, and instruct the first notification unit and/or the second notification unit to output a predetermined notification on the basis of the inter-drive-unit relative position information. The injection molding machine and the peripheral device output an alarm, turn on a light, or displays a warning on a monitor when the distance calculated on the basis of the inter-drive-unit relative position information is equal to or smaller than a predetermined value. In this way, the injection molding machine and the peripheral device can notify of the danger of collision of the movable parts. In this way, the injection molding machine and the peripheral device can avoid collision of the movable parts (for example, collision of the hand and the mold) more reliably.

Second Embodiment

Figure 6:
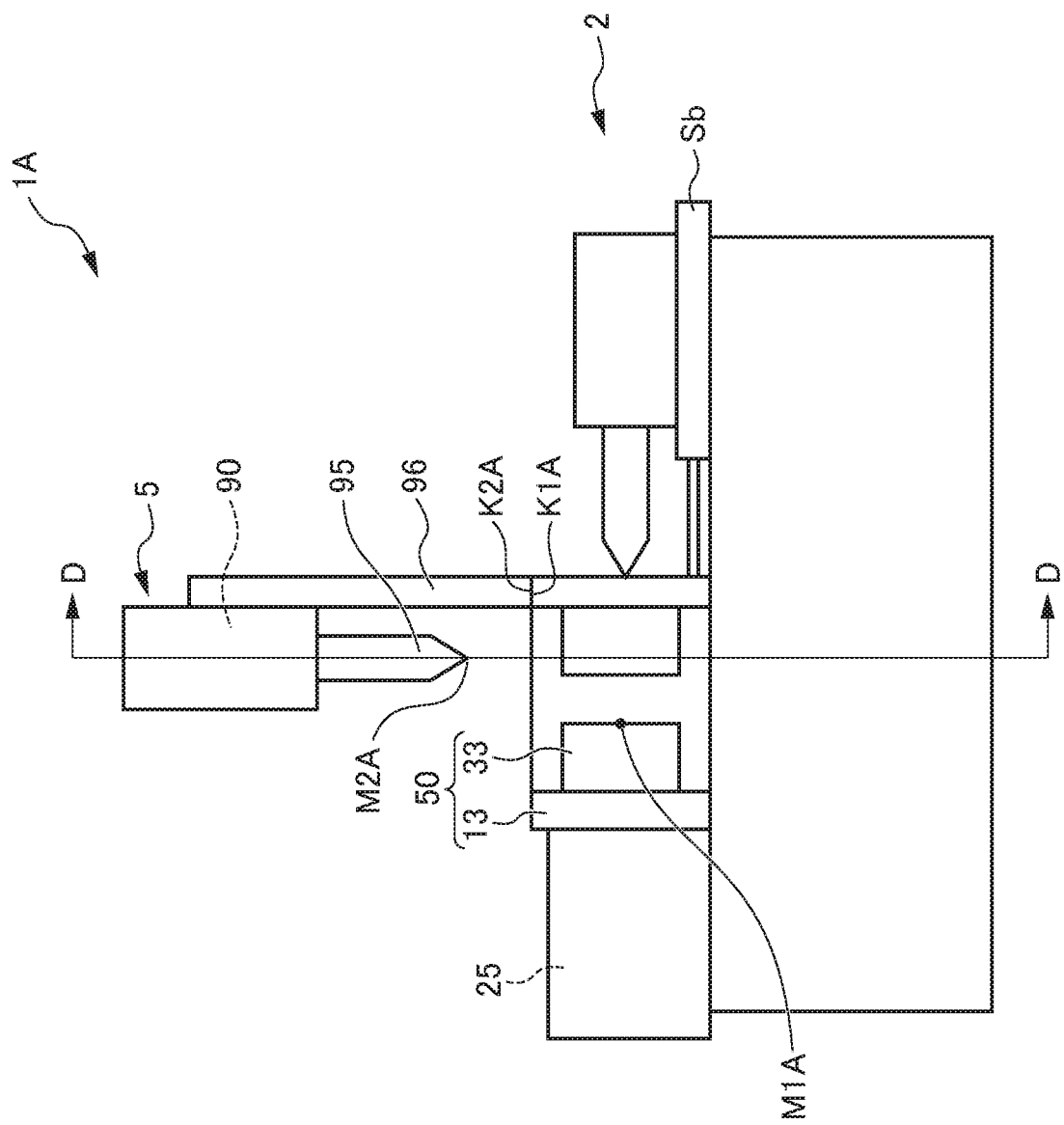
FIG. 6 is a diagram illustrating an injection molding system according to a second embodiment.
Figure 7:
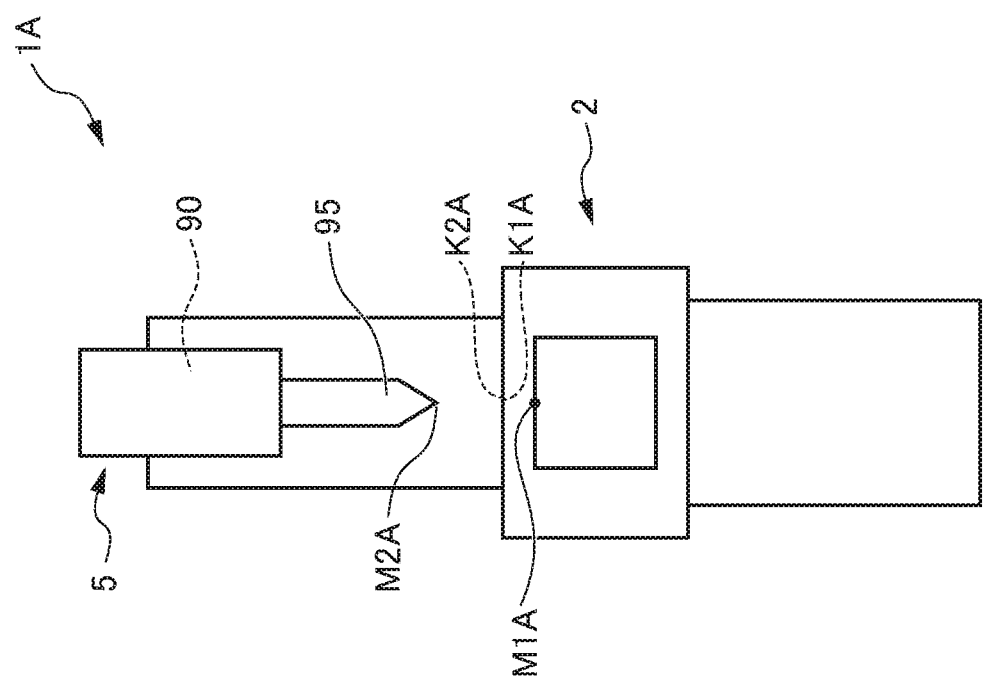
FIG. 7 is a cross-sectional view along line D-D in FIG. 6.

Next, an injection molding system according to a second embodiment will be described with reference to FIGS. 6 and 7. FIG. 6 is a diagram illustrating an injection molding system according to the second embodiment. FIG. 7 is a cross-sectional view along line D-D in FIG. 6. Hereinafter, a configuration different from the first embodiment will be described, and the description of the same configuration as that of the first embodiment will be omitted.

As illustrated in FIGS. 6 and 7, an injection molding system 1A includes an injection molding machine 2 and an additional injection device 5. The additional injection device 5 includes a vertical driving unit 90 (a second driving unit), a nozzle 95 (a second movable part), and a support 96.

The vertical driving unit 90 is configured to be able to move the additional injection device 5 in a direction (a vertical direction) indicated by an arrow. The vertical driving unit 90 is configured to be able to move the nozzle 95 to a position at which the nozzle is separated from the mold 30 and a position at which the nozzle makes contact with the mold 30.

The nozzle 95 is moved in a direction indicated by an arrow by the vertical driving unit 90. The nozzle 95 is a portion which makes contact with the mold 30 and through which a molding material is injected into the mold 30. In the present embodiment, a second movement position M2A is set to an end of the nozzle 95.

The support 96 is a rod-shaped member that supports the additional injection device 5. The support 96 is disposed on the upper surface of the injection molding machine 2 so as to extend along a vertical direction. In the present embodiment, a second reference position K2A is set to a lower end of the support 96.

In the present embodiment, the first reference position K1A on the injection molding machine 2 is set to a position (a contact position) which is on the upper surface of the injection molding machine 2 and corresponds to the second reference position K2A of the additional injection device 5.

Moreover, in the present embodiment, the first movement position M1A is set to the same position (the movable mold 33) as the first embodiment.

In the injection molding machine 2, the first control unit 110 (see FIG. 4) is configured to be able to calculate the first relative position information on the relative position of the first movement position M1A in relation to the first reference position K1A.

In the additional injection device 5, a second control unit (not illustrated) is configured to be able to calculate the second relative position information on the relative position of the second movement position M2A in relation to the second reference position K2.

In the injection molding machine 2, the first control unit 110 is configured to be able to calculate the inter-drive-unit relative position information on the relative position between the first movement position M1A and the second movement position M2A on the basis of the inter-reference relative position information, the first relative position information, and the second relative position information.

In the additional injection device 5, the second control unit is configured to be able to calculate the inter-drive-unit relative position information on the relative position between the first movement position M1A and the second movement position M2A on the basis of the inter-reference relative position information, the first relative position information, and the second relative position information.

The operations of the respective control units, the storage units, the communication units, and the notification units are the same as those of the first embodiment. According to the present embodiment, the same advantages as those of the first embodiment are obtained.

Third Embodiment

Figure 8:
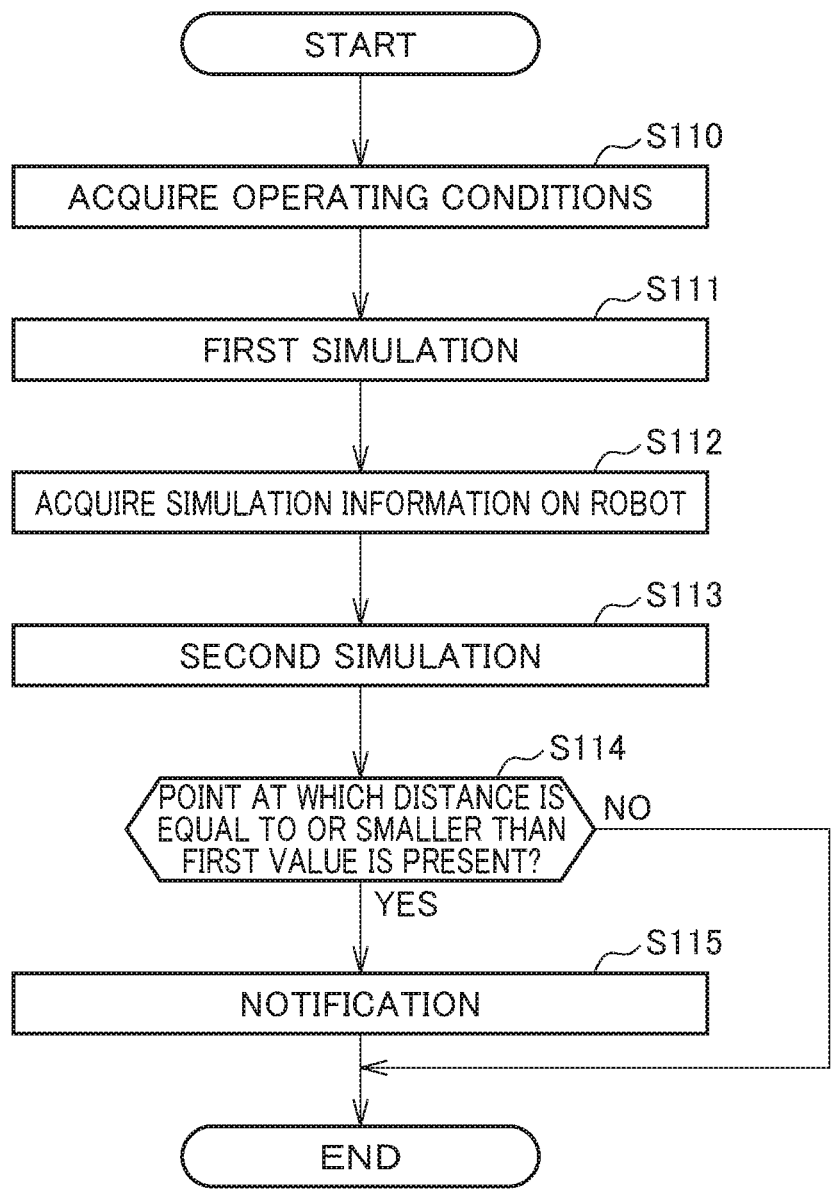
FIG. 8 is a flowchart for describing an operation of an injection molding machine according to a third embodiment.

Next, an operation of an injection molding machine according to a third embodiment will be described with reference to FIG. 8. FIG. 8 is a flowchart for describing the operation of an injection molding machine according to a third embodiment. In the present embodiment, a pre-simulation operation of the injection molding machine 2 of the first embodiment will be described. Hereinafter, a configuration different from the first embodiment will be described, and the description of the same configuration as that of the first embodiment will be omitted.

First, in step S110, the first control unit 110 acquires moving conditions (the operating conditions of the driving unit 25) of the movable part 50 from the first storage unit 120.

Subsequently, in step S111, the first control unit 110 simulates a moving trajectory of the movable part 50 (first simulation). The first control unit 110 outputs simulation information on the injection molding machine to the robot 3 via the first communication unit 130.

Subsequently, in step S112, the first control unit 110 acquires simulation information on the robot 3 via the first communication unit 130.

Subsequently, in step S113, the first control unit 110 simulates the inter-drive-unit relative position information which is the relative position between the first movement position M1 of the movable part 50 and the second movement position M2 of the hand 65 on the basis of the simulation information on the injection molding machine 2 and the simulation information on the robot 3 (second simulation).

Subsequently, in step S114, the first control unit 110 determines on the basis of the simulation information whether there is a point at which the distance between the movable part 50 and the hand 65 is equal to or smaller than a predetermined value. When it is determined that there is a point at which the distance is equal to or smaller than the predetermined value (YES), the first control unit 110 instructs the first notification unit 140 to output a predetermined notification. When it is not determined that there is a point at which the distance is equal to or smaller than the predetermined value (NO), the first control unit 110 ends the process.

In step S115, the first notification unit 140 outputs a predetermined notification on the basis of an instruction from the first control unit 110. For example, the first notification unit 140 highlights the point at which the distance is equal to or smaller than the predetermined value.

According to the present embodiment, the injection molding machine and the peripheral device (the robot 3) are configured to be able to ascertain a dangerous point of interference without actually moving the movable parts. In this way, the injection molding machine and the peripheral device can avoid interference of the movable parts without changing the operating conditions of the movable parts in advance.

Here, although the effects of the injection molding machine 2 are described in the present embodiment, the same effects are obtained in the robot 3.

While the first to third embodiments have been described, the present invention is not limited to these embodiments. Naturally, modifications and improvements made within a range where the objects of the present invention can be achieved also fall within the scope of the present invention.

EXPLANATION OF REFERENCE NUMERALS

1 Injection molding system
2 Injection molding machine
3 Robot
10 Mold clamping device
13 Movable platen
25 Driving unit
30 Mold
33 Movable mold
40 Injection device
50 Movable part
60 Driving mechanism
65 Hand
80 First connection portion
85 Second connection portion
110 First control unit
120 First storage unit
130 First communication unit
140 First notification unit
210 Second control unit
220 Second storage unit
230 Second communication unit
240 Second notification unit

What is claimed is:

1. An injection molding system comprising an injection molding machine and a peripheral device connected to the injection molding machine, wherein
    the injection molding machine includes:
    a movable mold configured to hold an object therein;
    a first driver that moves the movable mold;
    a frame on which the movable mold and the first driver are mounted;
    a first controller that is configured to execute a program that when executed, calculates a first relative position information on a relative position of a first movement position of the movable mold in relation to a first reference position of the injection molding machine; and
    a first output that is configured to execute a program that when executed, outputs the first relative position information calculated by the first controller to the peripheral device, and
    the peripheral device includes:
    a movable hand clamp configured to remove an object from the movable mold;
    a second driver that moves the movable hand clamp;
    a second controller that is configured to execute a program that when executed, calculates second relative position information on a relative position of a second movement position of the movable hand clamp in relation to a second reference position of the peripheral device; and
    a second output that is configured to execute a program that when executed, outputs the second relative position information calculated by the second controller to the injection molding machine, wherein
    the injection molding machine further includes a first connector connected to the peripheral device and directly attached to the frame,
    the peripheral device further includes a second connector connected to the injection molding machine and configured to receive the first connector,
    the first reference position is a predetermined position of the first connector on the frame,
    the second reference position is a position of the second connector directly adjacent to the first reference position,
    an inter-reference relative position on a relative position between the first reference position and the second reference position is the same position, and
    at least one of the first controller and the second controller is configured to calculate inter-drive-unit relative position on a relative position between the first movement position of the first driver and the second movement position of the second driver on the basis of the first relative position information and the second relative position information in order to prevent the movable hand clamp from damaging the peripheral device by contact, or to prevent the movable hand clamp from damaging the injection molding machine by contact.

2. An injection molding machine connectable to a peripheral device including a movable hand clamp, a second driver that moves the movable hand clamp, and a second output that outputs second relative position information on a relative position of a second movement position of the movable hand clamp in relation to a second reference position of the peripheral device, the injection molding machine comprising:
    a movable mold;
    a first driver that moves the movable mold;
    a frame on which the movable mold and the first driver are mounted;
    a first controller that is configured to execute a program that when executed, calculates a first relative position information on a relative position of a first movement position of the movable mold in relation to a first reference position of the injection molding machine; and a first output that is configured to execute a program that when executed, outputs the first relative position information calculated by the first controller to the peripheral device, wherein the injection molding machine further includes a first connector connected to the peripheral device and directly attached to the frame, the peripheral device further includes a second connector connected to the injection molding machine and configured to receive the first connector, the first reference position is a predetermined position of the first connector on the frame, the second reference position is a position of the second connector directly adjacent to the first reference position, an inter-reference relative position on a relative position between the first reference position of the injection molding machine and the second reference position of the peripheral device is the same position, and the first controller is configured to calculate inter-drive-unit relative position on a relative position between the first movement position of the first driver and the second movement position of the second driver on the basis of the first relative position information and the second relative position information in order to prevent the movable hand clamp from damaging the peripheral device by contact, or to prevent the movable hand clamp from damaging the injection molding machine by contact.

3. The injection molding machine according to claim 2, wherein the first controller is configured to instruct the first driver to perform an interference avoidance operation on the basis of the inter-drive-unit relative position.

4. The injection molding machine according to claim 3, wherein the first controller is configured to instruct the first driver to stop movement of the movable mold or change a moving direction of the first movable part as the interference avoidance operation.

5. The injection molding machine according to claim 2, further comprising:

a first notifier, wherein the first controller is configured to instruct the first notifier to output a predetermined notification on the basis of the inter-drive-unit relative position.

6. The injection molding machine according to claim 2, wherein the first controller is configured to calculate first time-sequential relative position information on the basis of predetermined time-sequential position information of the movable mold and calculate time-sequential inter-drive-unit relative position information on the basis of second time-sequential relative position information output from the peripheral device and the first time-sequential relative position information.

7. A peripheral device connectable to an injection molding machine including a movable mold, a first driver that moves the movable mold, a frame on which the movable mold and the first driver are mounted, and a first output that outputs first relative position information on a relative position of a first movement position of the movable mold in relation to a first reference position of the injection molding machine, the peripheral device comprising:

a movable hand clamp;

a second driver that moves the movable hand clamp;

a second controller that is configured to execute a program that when executed, calculates a second relative position information on a relative position of a second movement position of the movable hand clamp in relation to a second reference position of the peripheral device, and a second output that is configured to execute a program that when executed, outputs the second relative position information calculated by the second controller to the injection molding machine, wherein the injection molding machine further includes a first connector connected to the peripheral device and directly attached to the frame, the peripheral device further includes a second connector connected to the injection molding machine and configured to receive the first connector, the first reference position is a predetermined position of the first connector on the frame, the second reference position is a position of the second connector directly adjacent to the first reference position, an inter-reference relative position on a relative position between the first reference position of the injection molding machine and the second reference position of the peripheral device is the same position, and the second controller is configured to calculate inter-drive-unit relative position information on a relative position between the first movement position of the first driver and the second movement position of the second driver on the basis of the first relative position information and the second relative position information in order to prevent the movable hand clamp from damaging the peripheral device by contact, or to prevent the movable hand clamp from damaging the injection molding machine by contact.

8. The peripheral device according to claim 7, wherein the second controller is configured to instruct the second driver to perform an interference avoidance operation on the basis of the inter-drive-unit relative position.

9. The peripheral device according to claim 8, wherein the second controller is configured to instruct the second driver to stop movement of the movable hand clamp or change a moving direction of the movable hand clamp as the interference avoidance operation.

10. The peripheral device according to claim 7, further comprising:

a notifier, wherein the second controller is configured to instruct the notifier to output a predetermined notification on the basis of the inter-drive-unit relative position.

11. The peripheral device according to claim 7, wherein the second controller is configured to calculate second time-sequential relative position information on the basis of predetermined time-sequential position information of the movable hand clamp and calculate time-sequential inter-drive-unit relative position information on the basis of first time-sequential relative position information output from the injection molding machine and the second time-sequential relative position information.

* * * * *